(12) United States Patent
Zhao et al.

(10) Patent No.: US 9,406,077 B1
(45) Date of Patent: Aug. 2, 2016

(54) SYSTEM AND METHOD FOR AD KEYWORD SCORING

(75) Inventors: Gaofeng Zhao, Santa Clara, CA (US); Ping Fu, Los Altos, CA (US)

(73) Assignee: Google Inc., Mountain View, CA (US)

( * ) Notice: Subject to any disclaimer, the term of this patent is extended or adjusted under 35 U.S.C. 154(b) by 349 days.

(21) Appl. No.: 13/277,171

(22) Filed: Oct. 19, 2011

(51) Int. Cl.
*G06F 17/30* (2006.01)
*G06Q 30/02* (2012.01)

(52) U.S. Cl.
CPC ........ *G06Q 30/0242* (2013.01); *G06Q 30/0247* (2013.01)

(58) Field of Classification Search
USPC .......................................................... 707/944
See application file for complete search history.

(56) References Cited

U.S. PATENT DOCUMENTS

| | | | |
|---|---|---|---|
| 2005/0091106 A1* | 4/2005 | Reller et al. | 705/14 |
| 2007/0016473 A1* | 1/2007 | Anderson et al. | 705/14 |
| 2008/0137819 A1* | 6/2008 | Temov | 379/88.17 |
| 2008/0306819 A1* | 12/2008 | Berkhin et al. | 705/14 |
| 2010/0138451 A1* | 6/2010 | Henkin et al. | 707/803 |
| 2010/0223125 A1* | 9/2010 | Spitkovsky | 705/14.42 |
| 2010/0228622 A1* | 9/2010 | Vijayakrishnan | G06Q 30/02 705/14.44 |

OTHER PUBLICATIONS

PPC Hero, The Ultimate Guide to Google AdWords Quality Score, Aug. 8, 2011, pp. 1-5.*
Slawski, Google's Second Most Important Algorithm? Before Google's Panda, There Was Phil, Jul. 8, 2011, pp. 1-18.*

* cited by examiner

*Primary Examiner* — Albert Phillips, III
(74) *Attorney, Agent, or Firm* — Foley & Lardner LLP; John D. Lanza; James De Vellis

(57) ABSTRACT

Methods, systems, and apparatuses, including computer programs encoded on computer-readable media, for advertisement keyword scoring. A processing circuit receives a request for an advertisement to be provided to a user during a user session. The advertisement is to be provided alongside other content that is associated with a first plurality of keywords. A processing circuit identifies a plurality of advertisements based on the first plurality of keywords. Each of the plurality of advertisements is associated with a second plurality of keywords. The processing circuit calculates a keyword score for each of the second plurality of keywords for each of the plurality of advertisements. Based on the keyword score, one of the keywords for each of the plurality of the plurality of advertisements is selected. Based on a comparison of the selected keywords, the advertisement to be provided to the user is selected.

20 Claims, 5 Drawing Sheets

SYSTEM AND METHOD FOR AD KEYWORD SCORING

BACKGROUND

An advertisement program attempts to select advertisements to display on a given web page based on how likely a user is to click on the advertisement. Selecting a relevant advertisement based on the content of a web page is one way to increase the likelihood of a user of the web page clicking on the advertisement. Several factors are considered in determining the relevancy of an advertisement to the content of a web page. One factor relates to keywords, which are words or phrases that are associated with advertisements and web pages. An advertiser may, for example, select keywords for an advertisement through an online keyword auction. Keywords may be selected for a web page by, for example, a content analysis engine or a web page owner. An advertisement whose keywords are closely matched with the keywords of a web page may have an increased likelihood of being clicked on. Therefore, a closely matched advertisement has a high likelihood of being selected by the advertisement program to be displayed on a given web page.

Advertisers strive to select a group of keywords that will increase the likelihood of their advertisement appearing on a web page. They frequently monitor the success of their keyword strategy and continue to improve their keyword selection to maximize their revenues. Advertisements may be matched to a web page using all the keywords associated with the advertisement. As a result, it is difficult for advertisers to monitor the effect a single keyword has on their advertisement being selected and clicked on by a user.

SUMMARY

In general, one aspect of the subject matter described in this specification can be embodied in a method for advertisement keyword scoring. A processing circuit receives a request for an advertisement to be provided to a user during a user session. The advertisement is to be provided alongside other content that is associated with a first plurality of keywords. A processing circuit identifies a plurality of advertisements based on the first plurality of keywords. Each of the plurality of advertisements is associated with a second plurality of keywords. The processing circuit calculates a keyword score for each of the second plurality of keywords for each of the plurality of advertisements. Based on the keyword score, one of the keywords for each of the plurality of the plurality of advertisements is selected. Based on a comparison of the selected keywords, the advertisement to be provided to the user is selected. In another implementation, a subset of the second plurality of keywords contains an addition, deletion or change of a keyword. Based on this change, a report may be generated about an advertisement metric. A publisher may then add, delete, or change the keyword to the advertisement based on the advertisement metric.

Another implementation is a method for selecting a keyword. A processing circuit predicts the effect a keyword has on an advertisement campaign. An input is received by a user interface over a network corresponding to adding, deleting or changing the keyword to an advertisement. The keyword is added, deleted or changed to the advertisement.

Other implementations of this aspect include corresponding systems, apparatuses, and computer-readable media configured to perform the actions of the method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Systems and methods of the present solution are directed to a per-keyword scoring and attribution process and tool that allows an advertisement program to select an advertisement to display based on an individual keyword. The technology allows an advertiser to achieve per-keyword target control. The technology further allows an advertiser to predict or analyze the result of adding, deleting, editing or changing bid parameters for target keywords.

Figure 1A:
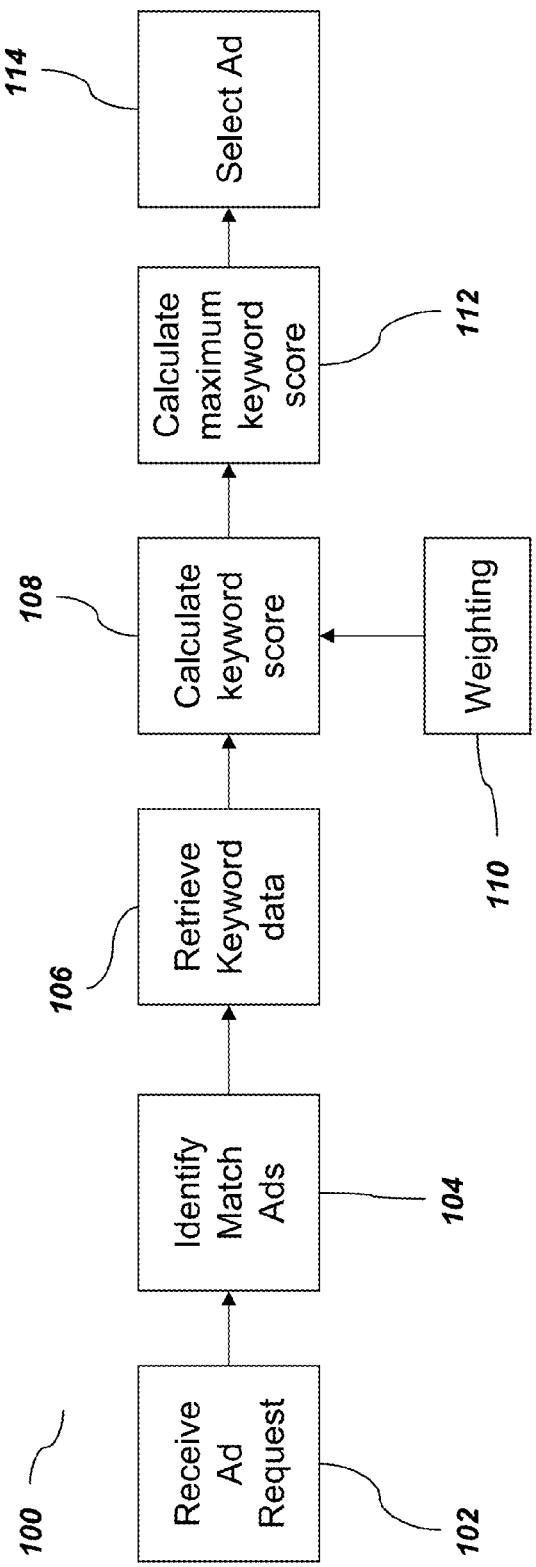
FIG. 1A is a flow diagram of a process for selecting an advertisement on a per keyword basis.

FIG. 1A is a flow diagram of a process of per-keyword scoring and attribution for content ads in accordance with an illustrative example. The process 100 can be implemented on a computing device. In one implementation, the process 100 is encoded on a computer-readable medium that contains instructions that, when executed by a computing device, cause the computing device to perform operations of process 100.

At block 102, an advertisement request is received, e.g., from a publisher of a web page or from a user device. In one implementation, this advertisement request is received in response to a user visiting a content page on the website of a publisher, e.g., a newspaper article, blog, classifieds site, game site, etc. A plurality of keywords may be associated with the content web page. The keywords may be automatically generated based on the content of the web page. Keywords may be automatically generated for a content page using a plurality of methods and systems. In one implementation, the keywords may be all or a subset of words and phrases that appear on the web page. In another implementation, keywords may include synonyms of words that appear on the web page or root words. In yet another implementation, a content analysis engine may analyze the content on a web page to determine one or more representative keyword. For example, for an article about camping, the process may generate "camping," "tents," etc. as keywords for the content page. In another implementation, the web page publisher may select one or more keywords for the web page and store it in a computer readable medium. Keywords may be any combination of text in any language. In some implementations, the keywords are words or phrases. In another implementation, the keywords may be a combination of letters and numbers.

At block 104, advertisements having keywords that match those of the content page are identified. Each advertisement may contain one or more keywords stored in a computer readable memory. These keywords may be any combination of text in any language. In some implementations, the keywords are words or phrases. In another implementation, the keywords may be a combination of letters and numbers. The keywords may have been selected by an advertiser. In some implementations, an advertiser may have selected the keywords for use in an auction by an advertiser. These advertisement may have been created by any entity and may relate to any product, business, service, etc. An advertisement may include text, an image, video, interactive game, audio, or any other form of communication, and any combination thereof. An advertisement may refer to an individual advertisement or a collection of advertisements with common distribution criteria. In some implementations, block 104 may include receiving only a pre-defined group of advertisements that meet a certain criteria. The criteria may be set by the advertisement program, the web page publisher, or the advertiser. The criteria may be the content of the advertisement, the quality of the advertisement, media type, language, demographics, product, service, or any other criteria. In some implementations, the criteria may be defined by age-appropriateness of the material. In another implementation, the group of advertisements may be defined by its pixel display size or other format characteristic. The advertisements may be received from a database or any other computer-readable memory via a network.

Matching advertisements may be identified using a plurality of methods and systems. In some implementations, the process may include comparing each advertisement keyword with a content web page keyword for a match. In other implementations, the process may also compare keyword synonyms, root words, etc. to identify additional matches.

At block 106, keyword data are received from a computer readable memory. The keyword data may be based on historic values, fixed variables, and so on. The keyword data may also be determined based on real-time analysis. The type and value of keyword data may vary each time the block 106 is triggered, or the keyword data may be fixed. The keyword data may include data related to such parameters as predicted click through rate, semantic relevancy, semantic word cluster ("phil cluster"), content vertical, etc. The keyword data may also include data related to the advertisement that a keyword is associated with, including the quality score of the advertisement.

In one implementation, the keyword data includes the click through rate for the advertisement the keyword is associated with. Click through rate for an advertisement is defined as the number of clicks on an advertisement divided by the number of times the advertisement is shown (impressions). The click through rate may be determined using historic data about the advertisement. In another implementation, the keyword data includes a predicted click through rate for the advertisement. The predicted click through rate represents the click through rate an advertisement may have in the future if displayed on a given content web page. The predicted click through rate may be determined by comparing the click through rate of a plurality of similar advertisements displayed on the given web page, or web pages with similar content. Similarity may be determined in a plurality of ways, including, e.g., overlapping keywords, product category, content, market, etc. Predicted click through rate may be determined by any method or system capable of providing a click through rate prediction. In some implementations, the predicted click through rate may be based on a model that uses past performance history. The model may include analyzing how a keyword performs in one advertisement group as compared to another advertisement group. The analysis may include a form of Bayesian click through rate prediction, or any other analysis that can provide a predicted click through rate.

In another implementation, the keyword data includes data that is determined based on real time analysis, such as data relating to semantic relevancy. Semantic relevancy refers to the relevancy between an advertisement keyword and a content web page keyword. A plurality of methods and systems may be used to calculate semantic relevancy. The process of calculating semantic relevancy may include comparing an advertisement keyword to a content web page keyword. An advertisement keyword that is closely matched to the content web page keyword is given a high semantic relevancy score. In another implementation, semantic relevancy may be calculated using latent semantic analysis, or any other form of content analysis that can determine semantic relevancy.

In some implementations, the keyword data may include the content vertical of the keyword. The content vertical of a keyword may refer to a topic, media type, genre, or segment a keyword falls into, e.g., baseball. The content vertical may be pre-determined for each keyword or may be determined on a real-time basis. The keyword data may include one or more content verticals for a keyword. The content vertical may be determined using a content analysis engine, further described below, or by any other system or method.

In some implementations, the keyword data received in process 100 may include semantic word clusters, also known as a phil cluster. For example, the words muffler, brakes, and tire may belong to the automotive parts semantic word cluster. A semantic word cluster may be determined by a content analysis engine. A content analysis engine relates words together and finds associations between them. The content analysis engine may be a clustering tool that gathers sets of words that relate to a common semantic concept. The engine may identify semantic similarity among documents, keywords, web pages, advertisements, etc. A content analysis engine may contain a training component that defines sets of words that are related to specific topics or semantic concepts, e.g., baseball, photography, camping, etc. A content analysis engine may also contain a component that evaluates a text fragment and returns word sets that are likely to match the text fragment. The text fragment may be words, phrases or numbers in a search query, web page, and/or advertisement. For example, a content analysis engine may automatically analyze the content of a web page to determine that the content of the web page is related to car insurance.

In another implementation, the keyword data may include the quality score of the advertisement. The quality score may be calculated in real-time using a plurality of factors. In some implementations, the quality score may be calculated using at least one of the following factors: the past performance of the advertisement on the content web page it is currently being requested for and/or other similar web pages; the relevance of the advertisement its keywords to the web page; the quality of the landing page of the advertisement; and other relevance factors. The past performance may include a plurality of factors, including click through rate, predicted click through rate, conversion rate, etc.

At block 108, a keyword score is calculated for each keyword for each advertisement identified in block 104. The keyword score may be calculated in real-time. The keyword score may be calculated using a plurality of factors. In some implementations, the keyword score is a sum of keyword matching scores. The keyword matching score represents how closely matched a keyword is to the content of a given web page, topic, vertical, semantic word cluster, etc. The keyword matching score may be calculated based on one or more keyword data. In one implementation, the keyword matching score may be the semantic relevancy of a keyword to the content of a web page. In another implementation, a keyword matching score may be the relationship between a semantic word cluster of a keyword and a semantic word cluster of a web page. For example, the task may be to determine the matching score between the keyword "car" and a web page about "car insurance". While the keyword, at first, may seem to be related to the web page, that may not necessarily be the case. The advertiser may specify, or the content analysis engine may automatically determine, that the advertisement is about selling car parts, thus making the keyword "car" belong to the automotive part's semantic word cluster. In this example, the matching score may be low because an advertisement about selling car parts is not that relevant to a web page discussing car insurance.

In another implementation, the keyword score may be a weighted sum of one or more keyword matching scores. In one implementation, the weighting factor may be based on a historic model. In another implementation, an automated training process generates a weighting factor for each keyword matching score that maximizes advertisement revenue. The training process may include monitoring the affect process 100 has on the click through rate, conversion rate, or any other metric on a subset of search engine users as compared to a control subset of search engine users. In some implementations, the weights are determined by statistical and/or quality experiments.

At block 112, a maximum keyword score is calculated by a processing circuit. The maximum score refers to the highest keyword score that was calculated in block 108.

At block 114, an advertisement with the highest keyword score is selected to be displayed on a web page. This advertisement may then be returned to the publisher, or to the user device to be presented to the user as part of the content page.

The process of selecting an advertisement based on a per-keyword score may be illustrated by the following example. In this example, an advertisement request has been received (block 102) and two advertisements are identified as matching the content of the web page (block 104). The two advertisements are Ads1 and Ads2. Ads1 has three keywords: k1, k2, k3; and Ads2 has two keywords: k4, k5. In this example, each keyword has the following keyword data (block 106), where "n" is the keyword number: (1) quality score ($Q\_n$); (2) semantic relevancy score (doc_weight_n); and (3) phil cluster advertisements ("phil_ads_n").

Using this keyword data, two intermediate scores are calculated for each keyword (block 108), where "*" represents a multiplication or a dot product. The first intermediate score is a keyword score (kw_n) which is calculated as follows: kw_1=Q_1*doc_weight_1; kw_2=Q_2*doc_weight_1; kw_3=Q_3*doc_weight_3; kw_4=Q_4*doc_weight_4; and kw_5=Q_5*doc_weight_5. The second intermediate score is a phil cluster score (phil_nx) which is calculated as follows:
phil_1=phil_ads_1*doc_weight_1;
phil_2=phil_ads_2*doc_weight_2;
phil_3=phil_ads_3*doc_weight_3;
phil_4=phil_ads_4*doc_weight_4; and
phil_5=phil_ads_5*doc_weight_5.

Thereafter, the calculation of the final keyword score (still referring to block 108) for each keyword (KW_score_n) is a weighted sum of the intermediate keyword score (kw_n) and the phil cluster score (phil_n):
KW_score_1=weight_kw*kw_1+weight_phil*phil_11;
KW_score_2=weight_kw*kw_2+weight_phil*phil_21;
KW_score_3=weight_kw*kw_3+weight_phil*phil_31;
KW_score_4=weight_kw*kw_4+weight_phil*phil_41;
KW_score_5=weight_kw*kw_5+weight_phil*phil_51. The weight_kw and weight_phil are weighting factors for the intermediate keyword score and phil cluster score, respectively, that were determined by statistical or quality experiments to maximize advertisement revenue (block 110).

The web page in this example contains keywords k1, k2, and k5, as well as phil clusters phil_21, and phil_25. The result, in this example, is: KW_score_1=weight_kw*kw_1+weight_phil*phil_11=0.3;
KW_score_2=weight_kw*kw_2+weight_phil*phil_21=0.5;
KW_score_3=weight_kw*kw_3+weight_phil*phil_31=0;
KW_score_4=weight_kw*kw_4+weight_phil*phil_41=0;
KW_score_5=weight_kw*kw_5+weight_phil*phil_51=0.4. Keywords three and four have a score of zero because those keywords or corresponding phil clusters are not present on the web page. Keyword k2 has the highest score because the web page contains k2 as well as phil_21.

In one implementation, per-keyword scoring may be facilitated via an advertisements group keyword criteria session that is built by aggregating the information related to each keyword. For example, keywords, top phil clusters, and top verticals may be organized under a hierarchical structure that allows for more efficient processing.

After calculating a keyword score for each keyword for each advertisement, the advertisement with the highest keyword score can be selected to be displayed on a web page (block 112). In this example, the keyword with the highest score is k2, which is associated with Ads1. Therefore, Ads1 will be selected to be displayed on the web page (block 114).

With this method, all advertisements are selected by individual target keyword performance. Furthermore, individual keyword reports can be generated for advertisers. Advertisers can use these reports to monitor the effect an addition, deletion, or change of an individual keyword has on their advertisement campaign. Advertisers can control their targeting keywords on a truly keyword base and can achieve per keyword control and attribution.

Figure 1B:
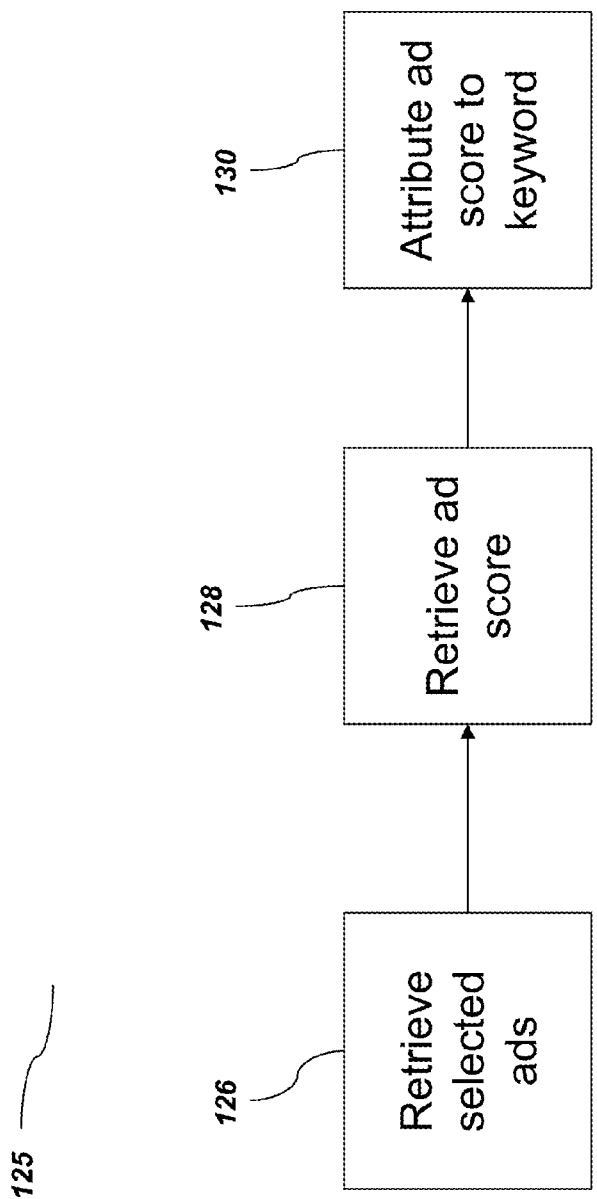
FIG. 1B is a flow diagram of a process for attributing an advertisement selection to a keyword score.

FIG. 1B is a flow diagram representing the user attributing an advertisement metric to a keyword 125 by a processing circuit. In one implementation, this feature is part of the user interface provided to the advertiser. A user may want the ability the attribute the efficacy of an advertisement campaign to an individual keyword, or group of keywords. For example, an advertisement program may contain information on the number of times an advertisement was displayed, under what circumstances it was displayed, and the click through rate and conversion rate. Using this information, this per keyword attribution process 125 may determine how each keyword affected the number of times an advertisement was displayed or any other relevant metric.

At block 126, the selected advertisements are retrieved. In one implementation, a user may select, via a user interface, one or more advertisements from one or more advertisement campaigns. Each advertisement may contain one or more keywords. The advertisements may be retrieved from computer readable memory or a database.

At block 128, an advertisement score is retrieved by the processing circuit. The advertisement score may be retrieved from a computer readable memory or a database. In one implementation, the advertisement score may be a historical average advertisement score based on all the times the advertisement was displayed. In another implementation, the advertisement score may be the historical average advertisement score based on all the times the advertisement was displayed on web pages about a specific topic, falling within a content vertical, belonging to a specific semantic word cluster, or containing certain keywords.

At block 130, the advertisement score is attributed to a keyword. Using the previously discussed example, the advertisement score may be correspond to the score of keyword two. Thus, using this process, an advertisement score may be attributed to that single keyword. This may be repeated for one or more advertisements for one or more content verticals or any other category. For example, it may be beneficial to determine the one or more keywords that have the most significant affect on an advertisement being displayed on a web page with baseball content. In one implementation, this process may use historical advertisement selection data and criteria to determine the advertisement score and the keyword responsible for that advertisement score.

Figure 2:
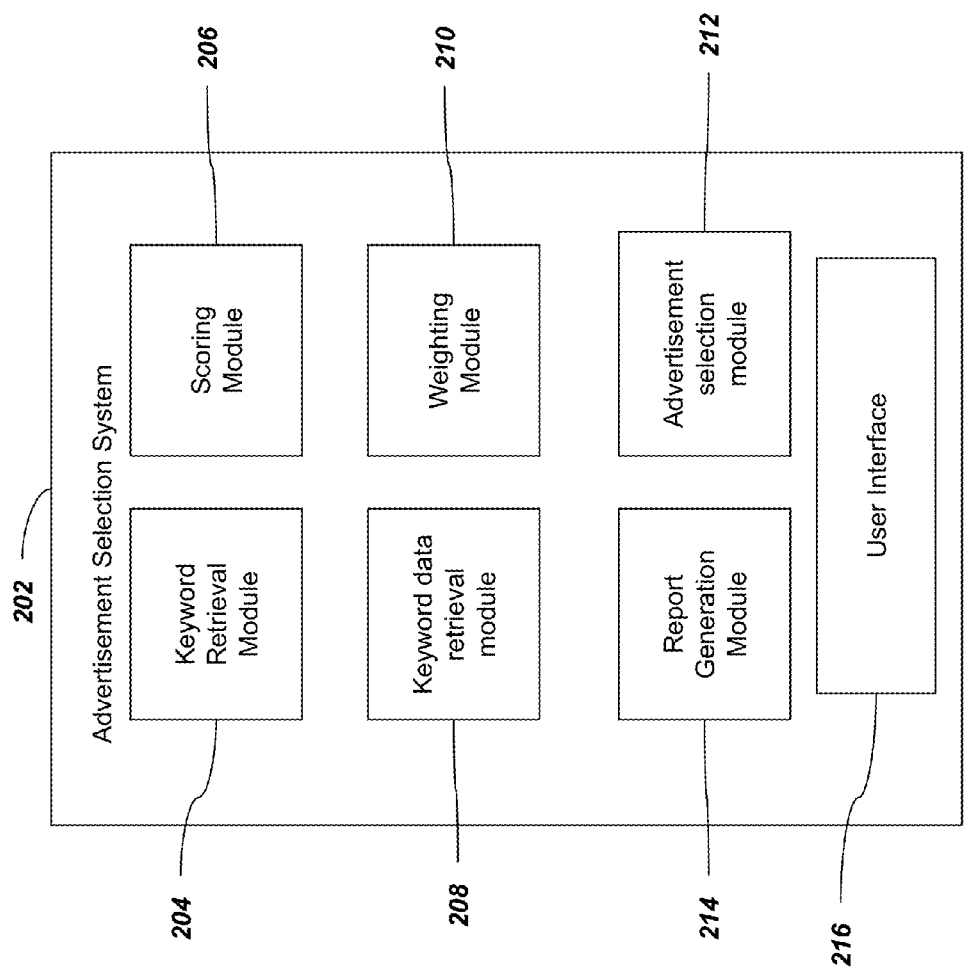
FIG. 2 shows an illustration of an example system and modules for per keyword scoring and attribution for content ads.
Figure 3:
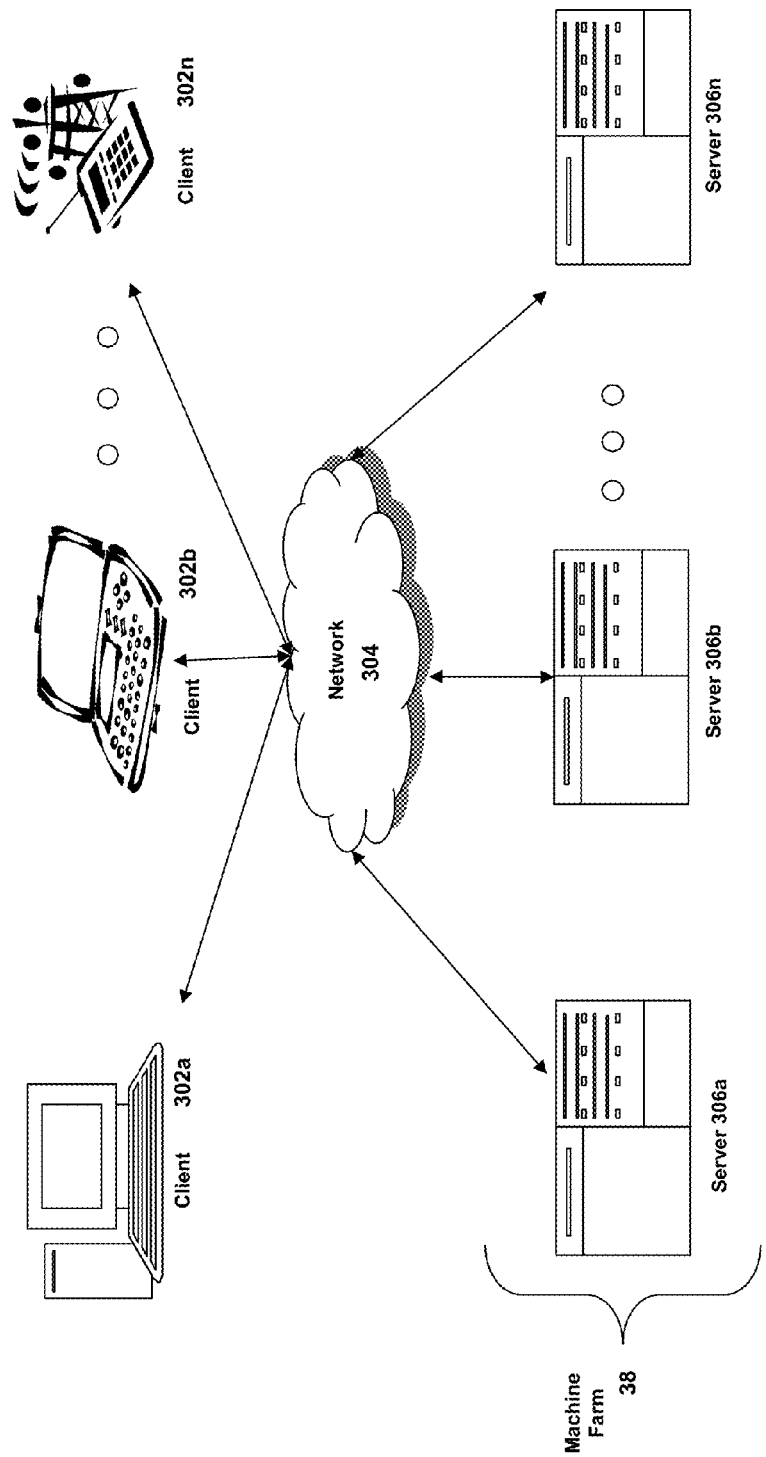
FIG. 3 shows an illustration of an example network environment comprising client machines in communication with remote machines.

FIG. 2 is an implementation of an advertisement selection system 202 according to an example embodiment. In brief overview, the per-keyword scoring and attribution computing device may include an advertisement retrieval module 204, a scoring module 206, a keyword data retrieval module 208, a weighting module 210, and an advertisement selection module 212. As described in greater detail below, the advertisement selection system 202 may operate on a client 302 or a server 306 or distribute its processes over a plurality of clients and/or servers as shown in FIG. 3. Additionally, the advertisement selection system 202 may be implemented using the components in FIG. 4.

The advertisement retrieval module 204 may be configured to retrieve one or more advertisements associated with one or more keywords. The advertisements and associated keywords may be stored in computer readable memory or transmitted to another module in the tool 202. The module 204 may be further configured to maintain the association between a keyword and an advertisement. The module 204 may, via the network, have access to an internal database that contains all this information, e.g., an advertisement program database. The module 204 may also retrieve keywords belonging to an entity by utilizing a variety of third-party services. In some implementations, the module may translate keywords from one language to another. The module 204 may store these keywords in a database so they may be later used by the user or a subsequent user of the keyword extension tool.

The keyword data retrieval module 208 is configured to retrieve data relating to keywords, such as the data described above in connection with FIG. 1. The data may be retrieved from a database or from memory associated with other modules 206, 210. The data may be of any type or form related to a keyword, a web page, and/or search engine query. In one implementation, the data may be at least one of the following: predicted click through rate, semantic relevancy, semantic word cluster, and content vertical. The data may be retrieved from a memory or database that is internal to the advertisement program, or it may be retrieved from any other source via a network. The module may be configured to determine values based on the data, or the data may contain pre-determined values. For example, the module may retrieve data, via a network, pertaining to a predicted click through rate. In another implementation, the module may retrieve historic data on the click through rate of a keyword and calculate the predicted click through rate. The module 208 may be configured to calculate values from the data in real-time. The module 208 may store the data in a memory or a database, or the module may transmit the data to another module. The module 208 may be configured to maintain the association between the data and a keyword and/or the data and the advertisements.

The scoring module 206 may be configured to calculate a keyword score, a keyword matching score, and/or an advertisement score. For example, the scoring module may be configured to calculate the scores discussed above in connection with FIG. 1. The scoring module 206 may be configured to use data from the keyword data retrieval module 208, or any other data from any other source. The scoring module 206 may perform a plurality of calculations to determine a score. In some implementations, the scoring module may perform one or more calculations described in process 100.

The weighting module 210 may be configured to calculate the weightings discussed above in connection with FIG. 1. In one implementation, the weighting module 210 may be configured to automatically generate a weight for one or more factors used to calculate a keyword score. The automated process may generate a weight to optimize one or more metrics. For example, the automated weighting module may be configured to generate weights that optimize advertisement revenue.

In one implementation, the weighting module 210 may be configured to perform a training process to generate a weight. In some implementations, the weighting module 210 may be configured to perform statistical and/or quality experiments. The training process may be an iterative process that adjusts weighting factors to optimize a metric. The process may include monitoring advertisement metrics such as click through rate, conversion rate, etc. for a test subset of search engine traffic, and comparing it with a control subset of search engine traffic. By iteratively varying the weighting factors and monitoring the effects, the weighting module may generate an optimal weighting factor to be used by the scoring module 206.

In some implementations, the selection system 202 may include a report generation module 214. The report may be displayed to a user via a display, as described in FIG. 4. The report may be electronically sent to a user via a network to a computing device. The report generation module 214 may be configured to provide a user with any type or form of metric regarding an advertisement campaign. A metric may be conversion rate, click through rate, advertisement revenue, etc. In one implementation, the report may show the effect a changed keyword has on an advertisement campaign. For example, the change may be an addition, deletion, or alteration of a keyword in an advertisement campaign. In another implementation, the report may show the hypothetical effect a keyword has on an advertisement campaign or any metric regarding an advertisement campaign, e.g., click through rate, conversation rate, etc. For example, a user may be able to attribute the success of an advertisement campaign to a single keyword.

In some implementations, the report generation module 214 may automatically provide a report when there is a change in keywords being used, on a periodic basis, and/or upon user request.

In some implementations, the user may be able to generate a hypothetical report prior to adding or deleting a keyword from an advertisement. The report generation module 214 may be configured to employ one or more modules in the selection system 202 to generate a hypothetical report. In some implementations, the report generation module may be configured to add or delete a keyword from an advertisement. For example, a user may determine, from the report, that a single keyword has a negligible affect on the click through rate of an advertisement. In this example, the user may choose to remove the keyword and direct the report generation module to generate a hypothetical report showing the effects of deleting the keyword. The user may, upon reviewing the hypothetical report, choose to actually remove the keyword from the advertisement campaign.

The user interface module 216 provides a way for the user to input information to the selection system 202, and a way for the tool to output information to the user. In one implementation, the user interface module 216 may interact with input devices, e.g., keyboard, mouse, touch surface, etc., and output devices, e.g., display, monitor, speakers, etc. associated with a user device. In some implementations, the tool may generate a graphical user interface that the user may directly manipulate. In another implementation, the tool may interface with another program, e.g., an advertisement program which then interfaces directly with the user. In this implementation, the per-keyword scoring and attribution tool may be a backend tool that is part of an advertisement program. In another implementation, the selection system 202 may be a stand alone tool with its own user interface. In yet another implementation, the per-keyword scoring and attribution tool may be a stand-alone API that third parties may integrate with.

In some implementations, the user interface module 216 may provide information to the user in real-time. In another implementation, the module may send information via an electronic message, notification, alert, etc., to the user. In some implementations, the user may interface with the tool via these electronic messages. The user interface may be configured according to any implementations described herein.

Aspects of the methods and systems discussed previously may be operate in the foregoing environment as well as associated system components (e.g., hardware elements). Referring to FIG. 3, an implementation of a network environment is depicted. In brief overview, the network environment includes one or more clients 302a-302n (also generally referred to as local machine(s) 302, client(s) 302, client node(s) 302, client machine(s) 302, client computer(s) 302, client device(s) 302, endpoint(s) 302, or endpoint node(s) 302) in communication with one or more servers 306a-306n (also generally referred to as server(s) 306, node 306, or remote machine(s) 306) via one or more networks 304. In some implementations, a client 302 has the capacity to function as both a client node seeking access to resources provided by a server and as a server providing access to hosted resources for other clients 302a-302n.

Although FIG. 3 shows a network 304 between the clients 302 and the servers 306, the clients 302 and the servers 306 may be on the same network 304. The network 304 can be a local-area network (LAN), such as a company intranet, a metropolitan area network (MAN), or a wide area network (WAN), such as the Internet or the World Wide Web. In some implementations, there are multiple networks 304 between the clients 302 and the servers 306. In one of these implementations, a network 304' (not shown) may be a private network and a network 304 may be a public network. In another of these implementations, a network 304 may be a private network and a network 304' a public network. In still another of these implementations, networks 304 and 304' may both be private networks.

The network 304 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 304 may comprise a wireless link, such as an infrared channel or satellite band. The topology of the network 304 may be a bus, star, or ring network topology. The network 304 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some implementations, different types of data may be transmitted via different protocols. In other implementations, the same types of data may be transmitted via different protocols.

In some implementations, the system may include multiple, logically-grouped servers 306. In one of these implementations, the logical group of servers may be referred to as a server farm 38 or a machine farm 38. In another of these implementations, the servers 306 may be geographically dispersed. In other implementations, a machine farm 38 may be administered as a single entity. In still other implementations, the machine farm 38 includes a plurality of machine farms 38. The servers 306 within each machine farm 38 can be heterogeneous—one or more of the servers 306 or machines 306 can operate according to one type of operating system platform (e.g., WINDOWS NT, manufactured by Microsoft Corp. of Redmond, Wash.), while one or more of the other servers 306 can operate on according to another type of operating system platform (e.g., Unix or Linux).

In one implementation, servers 306 in the machine farm 38 may be stored in high-density rack systems, along with associated storage systems, and located in an enterprise data center. In this implementation, consolidating the servers 306 in this way may improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 38 do not need to be physically proximate to another server 306 in the same machine farm 38. Thus, the group of servers 306 logically grouped as a machine farm 38 may be interconnected using a wide-area network (WAN) connection or a metropolitan-area network (MAN) connection. For example, a machine farm 38 may include servers 306 physically located in different continents or different regions of a continent, country, state, city, campus, or room. Data transmission speeds between servers 306 in the machine farm 38 can be increased if the servers 306 are connected using a local-area network (LAN) connection or some form of direct connection. Additionally, a heterogeneous machine farm 38 may include one or more servers 306 operating according to a type of operating system, while one or more other servers 306 execute one or more types of hypervisors rather than operating systems. In these implementations, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

Management of the machine farm 38 may be de-centralized. For example, one or more servers 106 may comprise components, subsystems and modules to support one or more management services for the machine farm 38. In one of these implementations, one or more servers 306 provide functionality for management of dynamic data, including techniques for handling failover, data replication, and increasing the robustness of the machine farm 38. Each server 306 may communicate with a persistent store and, in some implementations, with a dynamic store.

Server 306 may be a file server, application server, web server, proxy server, appliance, network appliance, gateway, gateway, gateway server, virtualization server, deployment server, SSL VPN server, or firewall. In one implementation, the server 306 may be referred to as a remote machine or a node.

The client 302 and server 306 may be deployed as and/or executed on any type and form of computing device, such as a computer, network device or appliance capable of communicating on any type and form of network and performing the operations described herein.

Figure 4:
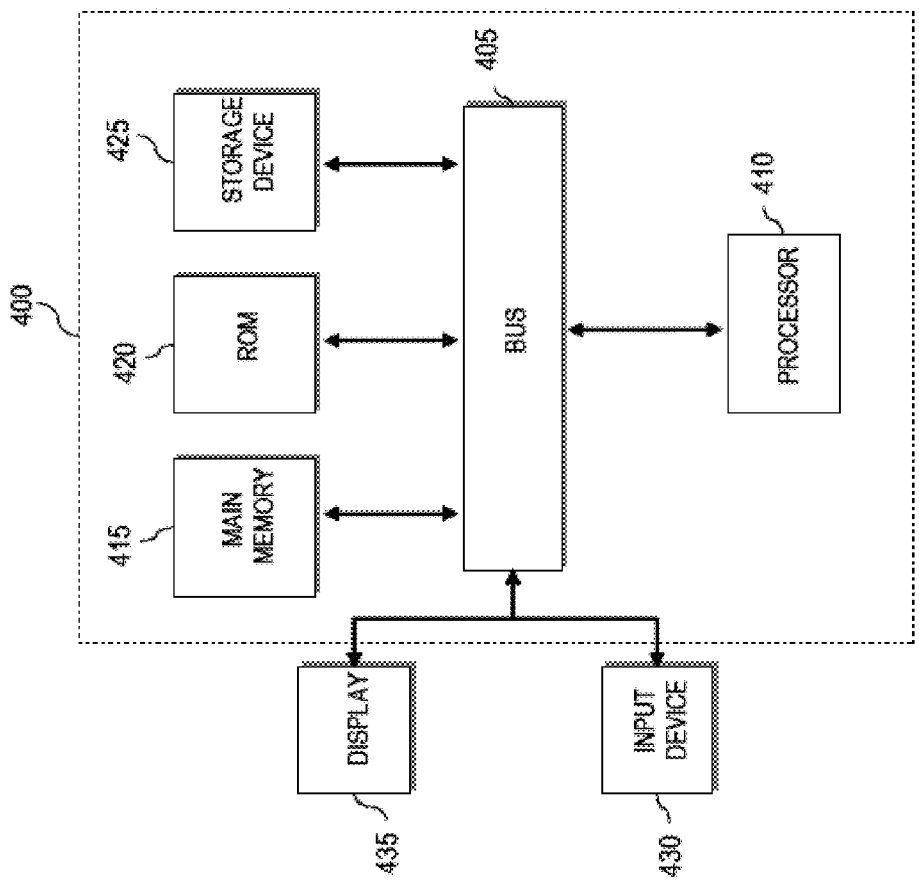
FIG. 4 is a block diagram of a computer system in accordance with an illustrative implementation.

FIG. 4 is a block diagram of a computer system in accordance with an illustrative implementation. The computer system or computing device 400 can be used to implement the per keyword scoring and attribution 202, modules 204, 206, 208, 210, 212, and 214. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 410 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hardwired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving, by a processing circuit, a request for an advertisement to be provided alongside other content, the other content having associated therewith a first plurality of keywords;
   identifying, by the processing circuit, a plurality of advertisements based on the first plurality of keywords, each of the plurality of advertisements comprising a second plurality of keywords input by a respective advertiser via an interface, the second plurality of keywords comprising at least two different keywords selected by the respective advertiser for use in an auction;
   calculating, by the processing circuit, a keyword score for each of the second plurality of keywords for each of the plurality of advertisements;
   selecting, by the processing circuit for each of the plurality of advertisements, a highest calculated keyword score from the keyword score calculated for each of the second plurality of keywords for each of the plurality of advertisements;
   selecting, by the processing circuit, based on the highest calculated keyword score, one and only one of the second plurality of keywords for each of the plurality of advertisements having the highest calculated keyword score;
   associating, by the processing circuit, the highest calculated keyword score of each of the selected keywords with a corresponding advertisement of the plurality of advertisements; and
   selecting, by the processing circuit, based on a comparison of the highest calculated keyword score associated with each of the plurality of advertisements, a highest scoring advertisement to be provided alongside the other content.

2. The method of claim 1, wherein calculating the keyword score is based on at least one of: a quality score, a semantic word cluster, a predicted click through rate, or a content vertical.

3. The method of claim 2, wherein calculating the keyword score further comprises applying weight factors.

4. The method of claim 3, wherein the weight factors are automatically generated, by a processing circuit, to optimize an advertisement metric.

5. The method of claim 4, wherein the advertisement metric is at least one of: an advertisement revenue, a click through rate or a conversion rate.

6. The method of claim 1, wherein the second plurality of keywords contains an addition, deletion or change of a subset of the second plurality of keywords.

7. The method of claim 6, further comprising generating a report based on an advertisement metric.

8. The method of claim 7, wherein the advertisement metric further comprises at least one of: an advertisement revenue, a click through rate, or a conversion rate.

9. The method of claim 8, wherein the report further comprises a comparison of the advertisement metric before the addition, deletion or change of the subset of the second plurality of keywords, and after the addition, deletion or change of the subset of the second plurality of keywords.

10. The method of claim 9, further comprising receiving a publisher input, wherein the publisher input corresponds to adding, deleting, or changing a subset of the second plurality of keywords.

11. A method of selecting a keyword, comprising:
predicting, by a processing circuit, an effect a keyword has on an advertisement campaign comprising an advertisement, the advertisement comprising a plurality of keywords input by an advertiser via an interface, the plurality of keywords comprising at least two different keywords selected by the advertiser for use in an auction, and wherein the predicting comprises calculating a separate keyword score for each of the plurality of keywords, the advertisement associated with an advertisement score based on one and only one of the calculated separate keyword score for each of the plurality of keywords;
receiving input, by an interface over a network, corresponding to adding, deleting, or changing the keyword to an advertisement;
adding, deleting, or changing the keyword to the advertisement by a processing circuit;
calculating, by the processing circuit responsive to a request for content, a keyword score for each of the plurality of keywords of the advertisement;
selecting, by the processing circuit, a highest calculated keyword score from the keyword score calculated for each of the plurality of keywords for the advertisement; and
selecting, by the processing circuit, based on the highest calculated keyword score, one and only one of the plurality of keywords for the advertisement having the highest calculated keyword score.

12. The method of claim 11, wherein the effect is at least one of advertisement revenue, click through rate, or conversion rate.

13. The method of claim 12, wherein calculating the keyword score is based on one or more web pages selected by a publisher, by a user interface.

14. A computing device for selecting advertisements comprising:
a keyword retrieval module executed by a processing circuit to retrieve a plurality of keywords from an advertisement, the plurality of keywords input by an advertiser via an interface, the plurality of keywords comprising at least two different keywords selected by the advertiser for use in an auction;
a keyword data retrieval module executed by the processing circuit to retrieve keyword data about each of the plurality keywords and store the keyword data in a computer readable memory;
a scoring module executed by the processing circuit to:
calculate, based on keyword data about each of the plurality of keywords, a keyword score for each of the plurality of keywords of the advertisement;
select a highest calculated keyword score from the keyword score calculated for each of the plurality of keywords;
select, based on the highest calculated keyword score, one and only one of the plurality of keywords as having the highest calculated keyword score;
determine an advertisement score based on the highest calculated keyword score; and
associate the advertisement score with the advertisement; and
an advertisement selection module configured to select the advertisement for display based on the advertisement score of the advertisement.

15. The computing device of claim 14, wherein the scoring module is further configured to calculate the keyword score based on at least one of: a quality score, a semantic word cluster, a predicted click through rate, and a content vertical.

16. The computing device of claim 15, further comprising a weighting module configured to automatically generate a weighting factor to increase an advertisement metric.

17. The computing device of claim 16, wherein the advertisement metric is at least one of: an advertisement revenue, a click through rate, and a conversion rate.

18. The computing device of claim 14, further comprising:
a user interface to receive an addition, deletion or change of a keyword;
a report generation module to generate a report containing an advertisement metric based on the addition, deletion, or change of the keyword; and
the user interface configured to display the report to a publisher.

19. The computing device of claim 18, wherein the user interface is further configured to receive an input regarding the addition, deletion, or change of the keyword.

20. The computing device of claim 19, wherein the user interface is further configured to transmit, via a network, the input regarding the addition, deletion, or change of the keyword to an advertisement program.

* * * * *